United States Patent Office 3,222,401
Patented Dec. 7, 1965

3,222,401
PROCESS FOR THE PRODUCTION OF NUCLE-
ARLY ALKYLATED AROMATIC AMINES
Louis Schmerling, Riverside, Ill., assignor to Universal
Oil Products Company, Des Plaines, Ill., a corporation
of Delaware
No Drawing. Filed Feb. 13, 1963, Ser. No. 258,167
15 Claims. (Cl. 260—578)

This invention relates to a process for preparing nuclearly substituted aromatic amines. More specifically, the invention is concerned with a process for preparing cycloalkyl substituted aromatic amines and particularly nuclearly substituted cycloalkyl aromatic amines in which the cycloalkyl substituent contains at least 5 carbon atoms.

It has now been discovered that aromatic amines may be alkylated in a nuclear portion with particular alkylating agents, the alkylating agents of the present invention comprising cycloalkenes and substituted cycloalkenes in which the cycloalkene radical contains at least 5 carbon atoms. The products thus prepared according to the process of this invention will find a wide variety of use in the chemical field particularly as intermediates in the preparation of dyes, pharmaceuticals, light-sensitive diazonium salts which are used for diazo printing papers and inhibitors which will retard the oxidative deterioration of various organic materials such as motor fuel, particularly unsaturated gasolines as, for example, cracked gasoline and polymer gasolines, diesel oil, mineral oil, lubricating oil, fuel oil, drying oil, greases, rubber monomers such as styrene, butadiene, etc., paraffin waxes, edible fats and oils, etc.

Among the edible fats and oils which may be of animal, vegetable or mineral origin and which tend to become rancid especially during long periods of storage prior to use are linseed oil, menhadin oil, cod liver oil, castor oil, olive oil, rapeseed oil, coconut oil, palm oil, corn oil, sesame oil, peanut oil, babassu oil, butter, fat, lard, beef tallow, etc. as well as the hydrogenated oils. These materials are adversely affected by oxygen with the resultant formation of undesirable gums, discoloration, rancidity or other deleterious reactions. Therefore, certain substances must be added to the aforementioned organic materials which act to stabilize such materials and thus delay or prevent the undesired reactions from occurring. These additives will fall within the broad term "inhibitors" which may be prepared from the intermediates formed according to the process of this invention.

In addition to the aforementioned uses, compounds prepared according to the process of the present invention and particularly the acid salts thereof such as the hydrochlorides may be utilized for the purpose of lowering the surface tension of various liquids such as water, a relatively small amount of the acid salt of the product yielding copious quantities of suds when admixed with water.

It is, therefore, an object of this invention to provide a process for the preparation of nuclearly substituted cycloalkyl aromatic amines.

Another object of this invention is to provide a process for preparing nuclearly substituted cycloalkyl aromatic amines in which the cycloalkyl substituent contains at least 5 carbon atoms.

Yet another object of this invention is to provide a process for preparing new compositions of matter comprising nuclearly substituted cycloalkyl amines, said cycloalkyl substituents containing at least 5 carbon atoms, the uses of which being hereinbefore set forth.

Taken in its broadest aspect one embodiment of this invention resides in a process for the preparation of a cycloalkyl substituted aromatic amine which comprises alkylating an aromatic amine with a cycloalkene containing at least 5 carbon atoms at alkylating conditions in the presence of at least one catalyst selected from the group consisting of Friedel-Crafts metal halides and hydrogen halides, said cycloalkene and said amine being the only reactants in the process, and recovering the desired cycloalkyl substituted aromatic amine.

Another embodiment of this invention is found in a process for the preparation of a cycloalkyl substituted aromatic amine which comprises alkylating an aromatic amine with a cycloalkene containing at least 5 carbon atoms at a temperature in the range of from about 150° to about 300° C. and at a pressure within the range of from about atmospheric to about 100 atmospheres in the presence of a Friedel-Crafts metal halide catalyst, and recovering the desired cycloalkyl substituted aromatic amine.

Yet another embodiment of this invention is found in a nuclearly substituted cyclooctyl aromatic amine.

Still another embodiment of this invention is found in a process for the preparation of a cyclooctyl substituted aromatic amine which comprises alkylating an aromatic amine with a cyclooctene at a temperature in the range of from about 150° to about 300° C. and at a pressure within the range of from about atmospheric to about 100 atmospheres in the presence of at least one catalyst selected from the group consisting of Friedel-Crafts metal halides and hydrogen halides, and recovering the desired cyclooctyl substituted aromatic amine.

A specific embodiment of this invention resides in a process for the preparation of a cycloalkyl substituted aromatic amine which comprises alkylating aniline with cyclooctene at a temperature in the range of from about 150° to about 300° C. and at a pressure within the range of from about atmospheric to about 100 atmospheres in the presence of a zinc chloride catalyst, and recovering the desired o-cyclooctylaniline.

Another specific embodiment of this invention is found in o-cyclooctylaniline.

Other objects and embodiments will be found in the following further detailed description of this invention.

As hereinbefore set forth, it has now been discovered that nuclearly substituted cycloalkyl aromatic amines may be prepared by condensing an alkylatable aromatic amine with an alkylating agent comprising an unsaturated cyclic hydrocarbon at alkylating conditions to form the desired product. The alkylatable aromatic amines are aromatic amines which contain at least one hydrogen atom on a ring carbon atom in ortho or para position to the amino group. The alkylatable aromatic amines which may be utilized in the process of this invention include aromatic amines and hydrohalide salts thereof. For purposes of this invention, the term "aromatic amine" as used in the present specification and appended claims will refer to both aromatic amines and hydrohalide salts of aromatic amines. Particularly useful aromatic amines which may be utilized include aniline, o-toluidine,
m-toluidine,
p-toluidine,
2,4-dimethylaniline,
2,5-dimethylaniline,
2,6-dimethylaniline,
2,4,6-trimethylaniline,
o-ethylaniline,
m-ethylaniline,
p-ethylaniline,
2,4-diethylaniline,
2,5-diethylaniline,
2,6-diethylaniline,
1-naphthylamine, 2-naphthylamine,
1-methyl-2-naphthylamine,
3-methyl-2-naphthylamine,
2-methyl-1-naphthylamine,
3-methyl-1-naphthylamine,
4-methyl-1-naphthylamine,
1-ethyl-2-naphthylamine,
2-ethyl-1-naphthylamine,
o-phenylenediamine,
m-phenylenediamine,
p-phenylenediamine,
4-methyl-o-phenylenediamine,
4-methyl-m-phenylenediamine,
4-ethyl-o-phenylenediamine,
4-ethyl-m-phenylenediamine,
2-methyl-p-phenylenediamine,
2-ethyl-p-phenylenediamine,
1,2,3-triaminobenzene,
1,2,4-triaminobenzene, etc.

Suitable hydrohalide salts of aromatic amines which may be used include o-toluidine hydrochloride,
o-toluidine hydrobromide,
m-toluidine hydrochloride,
m-toluidine hydrobromide,
p-toluidine hydrochloride,
p-toluidine hydrobromide,
2,4-dimethylaniline hydrochloride,
2,4-dimethylaniline hydrobromide,
2,5-dimethylaniline hydrochloride,
2,5-dimethylaniline hydrobromide,
2,6-dimethylaniline hydrochloride,
2,6-dimethylaniline hydrobromide,
2,4,6-trimethylaniline hydrochloride,
2,4,6-trimethylaniline hydrobromide,
o-ethylaniline hydrochloride,
o-ethylaniline hydrobromide,
m-ethylaniline hydrochloride,
m-ethylaniline hydrobromide,
p-ethylaniline hydrochloride,
p-ethylaniline hydrobromide,
2,4-diethylaniline hydrochloride,
2,4-diethylaniline hydrobromide,
2,5-diethylaniline hydrochloride,
2,5-diethylaniline hydrobromide,
2,6-diethylaniline hydrochloride,
2,6-diethylaniline hydrobromide,
2,4,6-triethylaniline hydrochloride,
2,4,6-triethylaniline hydrobromide,
1-naphthylamine hydrochloride,
1-naphthylamine hydrobromide,
2-naphthylamine hydrochloride,
2-naphthylamine hydrobromide,
1-methyl-2-naphthylamine hydrochloride,
1-methyl-2-naphthylamine hydrobromide,
3-methyl-2-naphthylamine hydrochloride,
3-methyl-2-naphthylamine hydrobromide,
2-methyl-1-naphthylamine hydrochloride,
2-methyl-1-naphthylamine hydrobromide,
3-methyl-1-naphthylamine hydrochloride,
3-methyl-1-naphthylamine hydrobromide,
1-ethyl-2-naphthylamine hydrochloride,
1-ethyl-2-naphthylamine hydrobromide,
2-ethyl-1-naphthylamine hydrochloride,
2-ethyl-1-naphthylamine hydrobromide,
o-phenylenediamine hydrochloride,
o-phenylenediamine hydrobromide,
m-phenylenediamine hydrochloride,
m-phenylenediamine hydrobromide,
p-phenylenediamine hydrochloride,
p-phenylenediamine hydrobromide,
4-methyl-o-phenylenediamine hydrochloride,
4-methyl-o-phenylenediamine hydrobromide,
4-methyl-m-phenylenediamine hydrochloride,
4-methyl-m-phenylenediamine hydrobromide,
4-ethyl-o-phenylenediamine hydrochloride,
4-ethyl-o-phenylenediamine hydrobromide,
4-ethyl-m-phenylenediamine hydrochloride,
4-ethyl-m-phenylenediamine hydrobromide,
2-methyl-m-phenylenediamine hydrochloride,
2-methyl-m-phenylenediamine hydrobromide,
2-methyl-p-phenylenediamine hydrochloride,
2-methyl-p-phenylenediamine hydrobromide,
2-ethyl-m-phenylenediamine hydrochloride,
2-ethyl-m-phenylenediamine hydrobromide,
2-ethyl-p-phenylenediamine hydrochloride,
2-ethyl-p-phenylenediamine hydrobromide,
1,2,3-triaminobenzene hydrochloride,
1,2,3-triaminobenzene hydrobromide,
1,2,4-triaminobenzene hydrochloride,
1,2,4-triaminobenzene hydrobromide, etc.

N-mono- and N-dialkyl derivatives of the above-mentioned compounds in which said alkyl group contains from 1 to 12 carbon atoms may also be cycloalkylated by the process of this invention although not necessarily with equivalent results.

Suitable alkylating agents which may be used in the process of this invention comprise cyclic unsaturated hydrocarbons containing at least 5 carbon atoms and particularly cyclic monoolefins. Examples of these alkylating agents which contain only carbon and hydrogen atoms include cyclopentene, cyclohexene, cycloheptene, cyclooctene, cyclononene, cyclodecene, cycloundecene, cyclododecene, etc., methylcyclopentenes, methylcyclohexenes, methylcycloheptenes, 1-methylcyclooctene, 3-methylcyclooctene, 4-methylcyclooctene, 5-methylcyclooctene, 1-ethylcyclooctene, 3-ethylcyclooctene, 4-ethylcyclooctene, 5-ethylcyclooctene, 1-propylcyclooctene, 3-propylcyclooctene, 4-propylcyclooctene, 5-propylcyclooctene, 1-isopropylcyclooctene, 3-isopropylcyclooctene, 4-isopropylcyclooctene, 1-methylcyclononene, 3-methylcyclononene, 4-methylcyclononene, 5-methylcyclononene, 6-methylcyclononene, 1-ethylcyclononene, 3-ethylcyclononene, 4-ethylcyclononene, 5-ethylcyclononene, 6-ethylcyclononene, 1-propylcyclononene, 3-propylcyclononene, 4-propylcyclononene, 1-isopropylcyclononene, 3-isopropylcyclononene, 4-isopropylcyclononene, 1-methylcyclodecene, 3-methylcyclodecene, 4-methylcyclodecene, 5-methylcyclodecene, 6 - methylcyclodecene, 1 - ethylcyclodecene, 3-ethylcyclodecene, 4-ethylcyclodecene, 1-propylcyclodecene, 3-propylcyclodecene, 4-propylcyclodecene, 1-isopropylcyclodecene, 3-isopropylcyclodecene, 4-isopropylcyclodecene, 1,2-dimethylcyclooctene, 2,3-dimethylcyclodecene, 2,3-diethylcyclodecene, 2,4-dimethylcyclooctene, 2,4-diethylcyclooctene, 1,2-dimethylcyclononene, 2,3-dimethylcyclononene, 2,3-diethylcyclononene, 2,4-dimethylcyclononene, 2,4-diethylcyclononene, 1,2-dimethylcyclodecene, 2,3-diethylcyclodecene, 2,4-dimethylcyclodecene, 2,4-diethylcyclodecene, etc. It is to be understood that the aforementioned aromatic amines, hydrohalide salts of aromatic amines and cycloalkenes containing at least 5 carbon atoms per molecule are only representatives of the class of compounds which may be used and that the process of the present invention is not necessarily limited thereto.

The alkylation of the aromatic amine or the hydrohalide salt thereof with cycloalkenes containing at least 5 carbon atoms is usually effected at elevated temperatures and pressures. The alkylation conditions which are utilized include a temperature within the range of from about 150° to about 350° C. or more. In addition, the reaction is effected at pressures ranging from about atmospheric to about 100 atmospheres or more, the preferred pressure being that which is sufficient to maintain at least a portion of the reactants in the liquid phase and may be effected by the introduction of a substantially inert gas such as nitrogen into the reaction zone. In addition, the reaction is effected in the presence of at least one catalyst selected from the group consisting of Friedel- Crafts metal halides and hydrogen halides. Of the Friedel-Crafts metal halide catalysts the preferred metal halides include zinc chloride, cuprous chloride, cupric chloride, etc. Other metal halides such as aluminum chloride, ferric chloride, etc., may also be used, although not necessarily with equivalent results. Of the hydrogen halides the preferred species to be used include hydrogen chloride and hydrogen bromide.

The process of this invention may be effected in any suitable manner and may comprise either a batch or continuous type operation. For example, when a batch type operation is used, a quantity of the hydrohalide salt of the aromatic amine and the alkylating agent are placed in an appropriate apparatus provided with heating means. Alternatively if an aromatic amine is to be cycloalkylated, a quantity of the aromatic amine, the cyclic olefin and the catalyst comprising a Friedel-Crafts type metal halide, preferably one which may be termed a "mild Friedel-Crafts type catalyst" such as zinc chloride are placed in a comparable apparatus. It is also contemplated within the scope of this invention that Friedel-Crafts type catalysts which are characterized as "strong" such as aluminum chloride, ferric chloride, aluminum bromide, etc. may also be used in stoichiometric amounts, although not necessarily with equivalent results. A particularly applicable apparatus in which to effect the batch type operation of the present process comprises a rotating autoclave. When such an apparatus is used, the aforementioned materials are placed in a glass liner thereof, following which the autoclave is sealed and heated to the desired temperature. As hereinbefore set forth, if superatmospheric pressures are desired, an inert gas such as nitrogen is pressed in to effect said pressure. The autoclave and contents thereof are then heated to the desired operating temperature and maintained thereat for a predetermined residence time. Upon completion of the desired residence time, the autoclave and contents thereof are cooled to room temperature, the excess pressure vented and the autoclave is opened. The reaction product is then recovered and subjected to treatment by conventional means to recover the desired product. One example of such treatment is to wash the product with an organic solvent such as ether and subject the extract to fractional distillation under reduced pressure. It is also possible to treat the product with water followed by extraction with ether. The aqueous layer which is recovered is made basic with an alkaline substance, extracted with ether and the ether extract subjected to fractional distillation under reduced pressure.

It is also contemplated within the scope of this invention that the process described herein may be effected in a continuous manner of operation although not necessarily with equivalent results. When such a method is used, the starting products comprising the hydrohalide salt of the aromatic amines and the alkylating agent comprising cyclic olefins containing at least 5 carbon atoms are continuously charged to a reaction zone which is maintained at the proper operating conditions of temperature and pressure. If a Friedel-Crafts type catalyst of the type hereinbefore set forth is to be utilized, the catalyst may be placed in the reactor in a fixed bed while the starting materials are passed through said bed in either an upward or downward flow. Upon completion of the desired residence time, the reactor effluent is continuously withdrawn, separated from unreacted starting materials which may be recycled to form a portion of the feed stock and subjected to treatment in a manner similar to that hereinbefore set forth whereby the desired product is separated and recovered.

Examples of nuclearly substituted cycloalkyl aromatic amines which may be prepared according to the process of this invention include o-cyclopentylaniline,
m-cyclopentylaniline,
p-cyclopentylaniline,
o-cyclohexylaniline,
m-cyclohexylaniline,
p-cyclohexylaniline,
o-cycloheptylaniline,
m-cycloheptylaniline,
p-cycloheptylaniline,
o-cyclooctylaniline,
m-cyclooctylaniline,
p-cyclooctylaniline,
o-cyclononylaniline,
m-cyclononylaniline,
p-cyclononylaniline,
o-cyclodecylaniline,
m-cyclodecylaniline,
p-cyclodecylaniline,
2-cyclopentyl-p-toluidine,
2-cyclohexyl-p-toluidine,
2-cycloheptyl-p-toluidine,
2-cyclooctyl-p-toluidine,
2-cyclononyl-p-toluidine,
2-cyclodecyl-p-toluidine,
6-cyclopentyl-o-toluidine,
6-cyclohexyl-o-toluidine,
6-cyclooctyl-o-toluidine,
6-cyclononyl-o-toluidine,
6-cyclodecyl-o-toluidine,
4-cyclopentyl-o-toluidine,
4-cyclohexyl-o-toluidine,
4-cycloheptyl-o-toluidine,
4-cyclooctyl-o-toluidine,
4-cyclononyl-o-toluidine,
4-cyclodecyl-o-toluidine,
4-cyclopentyl-1-naphthylamine,
4-cyclohexyl-1-naphthylamine,
4-cycloheptyl-1-naphthylamine,
4-cyclooctyl-1-naphthylamine,
4-cyclononyl-1-naphthylamine,
4-cyclodecyl-1-naphthylamine,
1-cyclopentyl-2-naphthylamine,
1-cyclohexyl-2-naphthylamine,
1-cycloheptyl-2-naphthylamine,
1-cyclooctyl-2-naphthylamine,
1-cyclononyl-2-naphthylamine,
1-cyclodecyl-2-naphthylamine, etc.

It is to be understood that the aforementioned products are only representatives of the class of compounds which may be prepared and that the process of the present invention is not necessarily limited thereto.

The following examples are given to illustrate the process of the present invention which, however, are not intended to limit the generally broad scope of the present invention in strict accordance therewith.

*Example I*

Cycloalkylation of aniline was effected by placing 50 grams of aniline, 55 grams of cyclooctene and 20 grams of a catalyst comprising 25% zinc chloride on alumina pills in a glass liner of a rotating autoclave. The liner was sealed into the autoclave and nitrogen pressed in until an initial pressure of 30 atmospheres was reached. The autoclave and contents thereof were then heated to a temperature of about 150° C. and maintained in a range of from about 150° to about 250° C. for a period of 2.5 hours. During this time the maximum pressure rose to 75 atmospheres. Upon completion of the desired residence time the autoclave and contents thereof were cooled to room temperature, the final pressure being 30 atmospheres. The excess pressure was vented, the autoclave opened and 125 grams of reaction product was recovered.

The product which comprised a mixture of dark amber liquid and flocculent white solid was filtered and the solid was washed with several portions of ether. The combined filtrate and washings were then subjected to fractional distillation under reduced pressure. The cut boiling at 122°–123° C. at 0.6 mm. pressure (320°–321° C. at 760 mm. pressure) was recovered. This cut had a refractive index $n_D^{20}$, of 1.5643. Basic nitrogen determination of the cut indicated that it had a molecular weight of 203.6 while the molecular weight calculated for cyclooctylaniline is 203.3. The cut was subjected to nuclear magnetic resonance and infrared analysis which indicated that 90% of this cut was o-cyclooctylaniline.

*Example II*

A mixture of 82 grams of aniline hydrobromide and 36 grams of cyclooctene was placed in the glass liner of a rotating autoclave. The liner was sealed into the autoclave and nitrogen pressed in until an initial pressure of 30 atmospheres was reached. The autoclave and contents thereof were then heated to a temperature of about 150° C. and maintained in a range of from about 150° to about 300° C. for a period of 4 hours, the maximum pressure during this time reaching 85 atmospheres. At the end of this time the autoclave and contents thereof were cooled to room temperature, the final pressure being 30 atmospheres. The excess pressure was vented, the autoclave opened and the reaction product comprising 106 grams, a mixture of amber liquid and crystals, was separated and recovered. The product was then treated with water containing a minor amount of hydrochloric acid to assure acidic conditions and extracted with ether. This resulted in 3 layers which were separated in a separatory funnel. The intermediate layer was made alkaline and extracted with ether. The ether extract was then subjected to fractional distillation under reduced pressure and the cut boiling at 116°–127° C. at 0.5 mm. pressure (320°–337° C. at 760 mm. pressure) having a refractive index, $n_D^{20}$ of 1.5499 was recovered. Basic nitrogen determination of this cut indicated that it had a molecular weight of 200.8 while that calculated for cyclooctylaniline is 203.3. Nuclear magnetic resonance analysis of this cut indicated that it comprised about 85% p-cyclooctylaniline and 15% o-cyclooctylaniline. These cyclooctylanilines were, it was apparent from their nuclear magnetic resonance spectra, mixed with isomeric (dimethylcyclohexyl)anilines.

When the lowest layer (of the 3 layers mentioned above) was made alkaline and extracted with ether, there was liberated unreacted aniline. It seems apparent that the hydrochloride of the cyclooctylaniline is less soluble in water than is the hydrochloride of aniline and forms a layer which is both water- and ether-insoluble. This permits the separation of aniline and its cyclooctyl derivatives by means other than distillation.

Addition of a drop of the cyclooctylaniline cut described above to a solution of a drop of concentrated hydrochloric acid in about 5 ml. of water produced a mixture which yielded copious suds on shaking. The surface tension of a 0.2% solution of the cut in water containing merely enough hydrochloric acid to give a slightly acidic solution was 40.0 dynes per cm. at 25° C.

*Example III*

Another experiment was performed in which lower reaction temperatures were used. In this example 164 grams of aniline hydrobromide and 75 grams of cyclooctene were placed in the glass liner of a rotating autoclave which was thereafter sealed into said autoclave. Nitrogen was pressed in until an initial pressure of 30 atmospheres was reached and the autoclave was heated to about 150° C. and maintained in a range of from about 150° to about 250° C. for a period of about 5.3 hours, the maximum pressure during this time reaching 68 atmospheres. Upon completion of the desired residence time, the autoclave and contents thereof were cooled to room temperature, the final pressure being 30 atmospheres. The excess pressure was vented, the autoclave was opened and 220 grams of product consisting of a mixture of amber liquid and crystals was recovered. The product was treated with water containing a small amount of hydrochloric acid and with ether. Two layers were obtained, a dark amber ether solution and a pale amber aqueous solution. When the ether solution was treated with anhydrous potassium carbonate to dry it, effervescence occurred. The extract was washed with water to separate an acidic aqueous solution which yielded an aniline derivative when made alkaline; fractional distillation gave a cut boiling at 121°–127° C. at 0.8 mm. pressure (317°–327° C. at 760 mm. pressure) and having a refractive index, $n_D^{20}$ of 1.5500. This was shown by nuclear magnetic resonance and infrared analysis to consist chiefly of p-cyclooctylaniline mixed with lesser amounts of o-cyclooctylaniline and o- and p-(dimethylcyclohexyl)aniline. Addition of a drop of this material to a very dilute aqueous solution of hydrochloric acid gave a solution which yielded copious suds on shaking.

The original ether layer was then subjected to fractional distillation under reduced pressure and the cut boiling at 120°–130° C. at 1.0 mm. pressure (324°–334° C. at 760 mm. pressure) having a refractive index, $n_D^{22}$, of 1.5400 was separated and recovered. Nuclear magnetic resonance and infrared analysis of this cut indicated that the majority of the cut comprised o-cyclooctylaniline with a small amount of p-cyclooctylaniline and (dimethylcyclohexyl)anilines present. This cut also yielded a sudsing solution when added to dilute hydrochloric acid, but the suds were less copious than were those obtained from the cut described in the preceding paragraph.

*Example IV*

Treating a mixture of 91 grams of aniline, 47 grams of cyclooctene and 20 grams of a 25% zinc chloride on alumina catalyst from 115° to 250° C. during 5.5 hours and working up the product by the procedures described in the above examples yielded material boiling largely at 107° to 112° C. at 0.3–0.4 mm. pressure and having a refractive index, $n_D^{21}$, of 1.550–1.551. Nuclear magnetic resonance and infrared analysis of this material indicated that the cut was chiefly a mixture of o- and p-cyclooctylaniline (in approximately equal amount) together with some of the isomeric o- and p-(dimethylcyclohexyl)anilines.

*Example V*

In this example a mixture of 103 grams (1.11 moles) of aniline, 51 grams (0.46 mole) of cyclooctene and 10 grams of zinc chloride was treated in a manner similar to that set forth in the above examples, that is, by effecting the reaction at a temperature of from about 150° to about 250° C. for a period of 5.5 hours at an initial pressure of 35 atmospheres. The 35 atmospheres consists of 30 atmospheres of nitrogen plus 5 atmospheres anhydrous hydrogen chloride which acted as a promoter. At the end of 5.5 hours the reaction product was recovered and also treated in a manner similar to that hereinbefore set forth. There was recovered 35 grams of cyclooctylaniline, the chief constituent being the o-isomer and in addition, a crystalline material which melted at a temperature in the range of from about 95°–100° C., and material being the hydrochloride salt of o-octylaniline.

*Example VI*

A mixture of 102 grams (1.10 moles) of aniline, 50 grams of cyclooctene and 15 grams of cyclooctyl chloride along with 10 grams of zinc chloride was placed in the glass liner of a rotating autoclave and treated in a manner similar to that hereinbefore set forth. The temperature during the reaction was maintained in a range of from about 150° to about 250° C. at an initial pressure of 30 atmospheres of nitrogen. At the end of the reaction time, the product was recovered and subjected to treatment in a manner similar to that set forth in the above examples. Fractional distillation of the residue resulted in the recovery of 26 grams of o-cyclooctylaniline having a refractive index $n_D^{20}$ of 1.5652. The o-cyclooctylaniline recovered in this experiment did not appear to be contaminated with (dimethylcyclohexyl)aniline.

*Example VII*

A mixture of 103 grams of aniline, 47 grams of cyclooctene and 10 grams of cuprous chloride catalyst was treated by placing the mixture in the glass liner of a rotating autoclave, sealing said glass liner into the autoclave, heating to a temperature of 150° C. and pressing in nitrogen until an initial pressure of 30 atmospheres was reached. The autoclave was maintained at a temperature from about 150° to about 250° C. for 5 hours during which time the maximum pressure rose to 53 atmospheres. At the end of this time, the autoclave and contents thereof were allowed to cool to room temperature, the final pressure being 30 atmospheres. The excess pressure was vented and the reaction product recovered. The product was worked up in a manner similar to that hereinbefore set forth and the ether extract subjected to fractional distillation under reduced pressure. There was recovered 28 grams of product having a refractive index $n_D^{20}$ of 1.5658, said product having a boiling point of 140° at 1.0 mm. pressure. Nuclear magnetic resonance analysis of this product indicated that the major component consisting of cyclooctylaniline with no appearance of (dimethylcyclohexyl)aniline.

*Example VIII*

A mixture of 90 grams (0.97 mole) of aniline, 50 grams (0.45 mole) of cyclooctene and 10 grams of cupric chloride was placed in the glass liner of a rotating autoclave and treated in a manner similar to that hereinbefore set forth. Upon completion of the desired residence time the product comprising a mixture of dark oil and a tarry solid was filtered and the solid was washed with ether. The ether washing and the liquid were combined to fractional distillation under reduced pressure. The cut, boiling in the range of 134°–138° C. at 1.0 mm. pressure having a refractive index $n_D^{20}$ of 1.5746, consisting mainly of o-cyclooctylaniline was separated and recovered.

*Example IX*

A mixture of 105 grams (1.12 mole) of aniline, 50 grams (0.61 mole) of cyclohexene and 10 grams of zinc chloride was placed in the glass liner of a rotating autoclave. The autoclave was sealed and nitrogen pressed in until an initial pressure of 30 atmospheres was reached. In addition, 5 atmospheres of anhydrous hydrogen chloride was also pressed in. The autoclave was maintained at a temperature of 150° to about 250° C. for a period of approximately 6 hours following which time the autoclave and contents thereof were allowed to cool to room temperature. During the reaction the maximum pressure rose to 50 atmospheres while the final pressure at room temperature was 25 atmospheres. The excess pressure was vented, the autoclave was opened and the reaction product was treated in a manner similar to that hereinbefore set forth in the above examples. Distillation of the alkalinized aqueous solution under reduced pressure yielded 15 grams of a cut boiling at 95°–97° C. at 0.6 mm. pressure having a refractive index $n_D^{21}$ of 1.5643. The basic nitrogen value of this cut corresponded to a molecular weight of 172.7 while that calculated for $C_6H_{11}C_6H_4NH_2$ is 175.3. The nuclear magnetic resonance analysis of this cut indicated that it contained a mixture of o-cyclohexylaniline and o-methylcyclopentylaniline with a small amount of the p-isomers.

*Example X*

A solution of 94 grams of p-toluidine hydrobromide and 55 grams of cyclooctene is placed in the glass liner of a rotating autoclave which is thereafter sealed into said autoclave. Nitrogen is pressed in until an initial pressure of 30 atmospheres is reached following which the autoclave is heated to a temperature of about 150° C. The autoclave and contents thereof are maintained at a temperature in the range of from about 150° to about 250° C. for a period of about 5 hours. At the end of this time the autoclave and contents thereof are allowed to cool to room temperature, the excess pressure is vented and the reaction product recovered from the autoclave. The reaction product is treated in a manner similar to that set forth in the above examples and the desired product comprising 2 - cyclooctyl-p-toluidine is separated and recovered.

*Example XI*

A mixture of 50 grams of aniline, 62 grams of 1-methylcyclooctene and 20 grams of zinc chloride catalyst such as that used in Example I is placed in the glass liner of a rotating autoclave which is thereafter sealed into said autoclave. Nitrogen is pressed in until an initial pressure of 30 atmospheres is reached and the autoclave is then heated to a temperature of about 150° C. The autoclave is maintained at a temperature in the range of from about 150° to about 250° C. for a period of 5 hours after which said autoclave and contents thereof are allowed to cool to room temperature, the excess pressure is vented and the reaction mixture is subjected to a treatment hereinbefore set forth in the above examples. The desired product, comprising (methylcyclooctyl)anilines is separated and recovered by fractional distillation under reduced pressure.

*Example XII*

A solution of 87 grams of aniline hydrobromide and 62 grams of cyclononene is placed in the glass liner of a rotating autoclave. The liner is sealed into the autoclave, nitrogen pressed in until an initial pressure of 30 atmospheres is reached and the autoclave is heated to a temperature of about 150° C. The autoclave and contents thereof are then maintained at a temperature in the range of from about 150° to about 250° C. for a period of about 4.5 hours. At the end of this time the autoclave and contents thereof are cooled to room temperature, the excess pressure is vented and the autoclave is opened and the reaction mixture containing the desired product is recovered. After treatment of the reaction mixture in a manner similar to that hereinbefore set forth it is subjected to fractional distillation under reduced pressure and the desired p-cyclononylaniline and isomers thereof are separated and recovered.

I claim as my invention:
1. A process for the preparation of a cycloalkyl substituted aromatic amine which comprises alkylating an aromatic amine having from 1 to 2 benzene rings with a cycloalkene hydrocarbon containing from 5 to 12 carbon atoms in the ring in the presence of at least one catalyst selected from the group consisting of Friedel-Crafts metal halides, hydrogen chloride and hydrogen bromide at a temperature of from about 150° to about 300° C. and a pressure of from about atmospheric to about 100 atmospheres, said amine and hydrocarbon being the only reactants in the process, and recovering the resultant cycloalkyl substituted aromatic amine.

2. A process for the preparation of a cycloalkyl substituted aromatic amine which comprises alkylating an aromatic amine having from 1 to 2 benzene rings with a cycloalkene hydrocarbon containing from 5 to 12 carbon atoms in the ring at a temperature in the range of from about 150° to about 300° C. and at a pressure within the range of from about atmospheric to about 100 atmospheres in the presence of a Friedel-Crafts metal halide catalyst, said amine and hydrocarbon being the only reactants in the process, and recovering the resultant cycloalkyl substituted aromatic amine.

3. A process for the preparation of a cycloalkyl substituted aniline which comprises alkylating aniline with a cycloalkene hydrocarbon containing from 5 to 12 carbon atoms in the ring at a temperature in the range of from about 150° to about 300° C. and at a pressure within the range of from about atmospheric to about 100 atmospheres in the presence of a Friedel-Crafts metal halide catalyst, said aniline and hydrocarbon being the only reactants in the process, and recovering the resultant cycloalkyl substituted aniline.

4. A process for the preparation of a cycloalkyl substituted aniline which comprises alkylating aniline hydrobromide with a cycloalkene hydrocarbon containing from 5 to 12 carbon atoms in the ring at a temperature in the range of from about 150° to about 300° C. and at a pressure within the range of from about atmospheric to about 100 atmospheres in the presence of at least one catalyst selected from the group consisting of Friedel-Crafts metal halides, hydrogen chloride and hydrogen bromides, said hydrobromide and hydrocarbon being the only reactants in the process, and recovering the resultant cycloalkyl substituted aniline.

5. A process for the preparation of a cycloalkyl substituted aniline which comprises alkylating p-toluidine hydrobromide with a cycloalkene hydrocarbon containing from 5 to 12 carbon atoms in the ring at a temperature in the range of from about 150° to about 300° C. and at a pressure within the range of from about atmospheric to about 100 atmospheres in the presence of at least one catalyst selected from the group consisting of Friedel-Crafts metal halides, hydrogen chloride and hydrogen bromides, said hydrobromide and hydrocarbon being the only reactants in the process, and recovering the resultant cycloalkyl substituted p-toluidine.

6. A process for the preparation of a cyclooctyl substituted aromatic amine which comprises alkylating an aromatic amine having from 1 to 2 benzene rings with a cyclooctene hydrocarbon at a temperature in the range of from about 150° to about 300° C. and at a pressure within the range of from about atmospheric to about 100 atmospheres in the presence of at least one catalyst selected from the group consisting of Friedel-Crafts metal halides, hydrogen chloride and hydrogen bromides, said amine and hydrocarbon being the only reactants in the process, and recovering the resultant cyclooctyl substituted aromatic amines.

7. A process for the preparation of a cyclononyl substituted aromatic amine which comprises alkylating an aromatic amine having from 1 to 2 benzene rings with a cyclononene hydrocarbon at a temperature in the range of from about 150° to about 300° C. and at a pressure within the range of from about atmospheric to about 100 atmospheres in the presence of at least one catalyst selected from the group consisting of Friedel-Crafts metal halides, hydrogen chloride and hydrogen bromides, said amine and hydrocarbon being the only reactants in the process, and recovering the resultant cyclononyl substituted aromatic amine.

8. A process for the preparation of a 2-methyl-cyclooctyl substituted aromatic amine which comprises alkylating an aromatic amine having from 1 to 2 benzene rings with a 1-methylcyclooctene hydrocarbon at a temperature in the range of from about 150° to about 300° C. and at a pressure within the range of from about atmospheric to about 100 atmospheres in the presence of at least one catalyst selected from the group consisting of Friedel-Chafts metal halides, hydrogen chloride and hydrogen bromides, said amine and hydrocarbon being the only reactants in the process, and recovering the resultant methylcyclooctyl substituted aromatic amine.

9. A process for the preparation of a cycloalkyl substituted aromatic amine which comprises alkylating an aromatic amine having from 1 to 2 benzene rings with a cycloalkene hydrocarbon containing from 5 to 12 carbon atoms in the ring at a temperature in the range of from about 150° to about 300° C. and at a pressure within the range of from about atmospheric to about 100 atmospheres in the presence of a zinc chloride catalyst, said amine and hydrocarbon being the only reactants in the process, and recovering the resultant cycloalkyl substituted aromatic amine.

10. A process for the preparation of a cycloalkyl substituted aromatic amine which comprises alkylating an aromatic amine having from 1 to 2 benzene rings with a cycloalkene hydrocarbon containing from 5 to 12 carbon atoms in the ring at a temperature in the range of from about 150° to about 300° C. and at a pressure within the range of from about atmospheric to about 100 atmospheres in the presence of a hydrogen halide in which the halogen is selected from the group consisting of chlorine and bromine, said amine and hydrocarbon being the only reactants in the process, and recovering the resultant cycloalkyl substituted aromatic amine.

11. A process for the preparation of cyclooctylaniline which comprises alkylating aniline with cyclooctene at a temperature in the range of from about 150° to about 300° C. and at a pressure within the range of from about atmospheric to about 100 atmospheres in the presence of zinc chloride and hydrogen chloride, said aniline and cyclooctene being the only reactants in the process, and recovering the resultant cyclooctylaniline.

12. A process for the preparation of cyclooctylaniline which comprises alkylating aniline with cyclooctene at a temperature in the range of from about 150° to about 300° C. and at a pressure within the range of from about atmospheric to about 100 atmospheres in the presence of hydrogen bromide, said aniline and cyclooctene being the only reactants in the process, and recovering the resultant cyclooctylaniline.

13. A process which comprises alkylating p-toluidine with cyclooctene at a temperature in the range of from about 150° to about 300° C. and at a pressure within the range of from about atmospheric to about 100 atmospheres in the presence of zinc chloride and hydrogen chloride, said p-toluidine and cyclooctene being the only reactants in the process, and recovering the desired 2-cyclooctyl-p-toluidine.

14. A process which comprises alkylating aniline with 1-methylcyclooctene at a temperature in the range of from about 150° to about 300° C. and at a pressure within the range of from about atmospheric to about 100 atmospheres in the presence of a zinc chloride catalyst, said aniline and 1-methylcyclooctene being the only reactants in the process, and recovering the resultant (methylcyclooctyl)aniline.

15. A process which comprises alkylating aniline with cyclononene at a temperature in the range of from about 150° to about 300° C. and at a pressure within the range of from about atmospheric to about 100 atmospheres in the presence of zinc chloride and hydrogen chloride, said aniline and cyclononene being the only reactants in the process, and recovering the resultant p-cyclononylaniline.

References Cited by the Examiner

UNITED STATES PATENTS

| | | | |
|---|---|---|---|
| 2,072,107 | 3/1937 | Fulton et al. | 260—578 |
| 2,154,192 | 4/1939 | Zinke | 260—624 |
| 2,161,826 | 6/1939 | Kyrides | 260—624 |
| 2,430,190 | 11/1947 | Schmerling et al. | 260—624 |
| 2,759,030 | 8/1956 | Schmerling | 260—671 |

OTHER REFERENCES

Cope et al., Journal of American Chemical Society, Volume 73, pp. 3419–3430.

CHARLES B. PARKER, *Primary Examiner.*